Nov. 9, 1954  R. M. WEBSTER, JR  2,693,841
TIRE INFLATION AND DEFLATION SYSTEM
Filed March 7, 1951  2 Sheets-Sheet 1

INVENTOR.
ROBERT M. WEBSTER, JR.
BY
Campbell, Brumbaugh, Free + Graves
HIS ATTORNEYS.

Nov. 9, 1954  R. M. WEBSTER, JR  2,693,841
TIRE INFLATION AND DEFLATION SYSTEM
Filed March 7, 1951                                        2 Sheets-Sheet 2
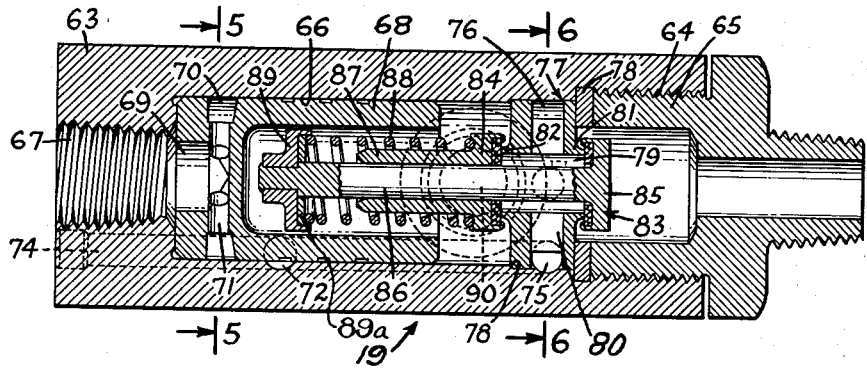
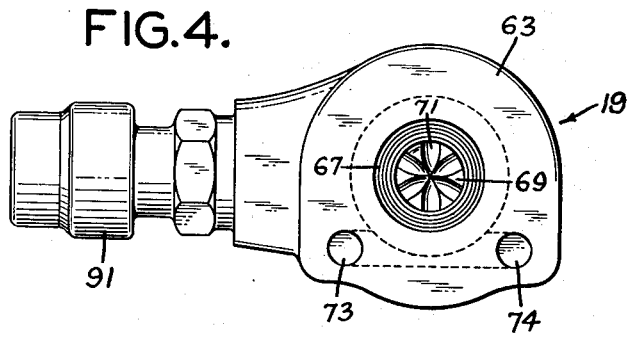
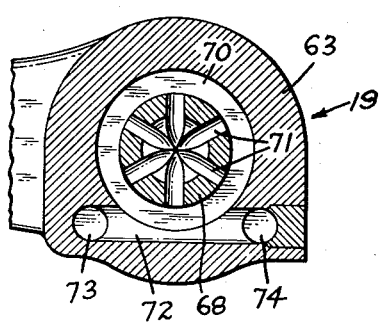 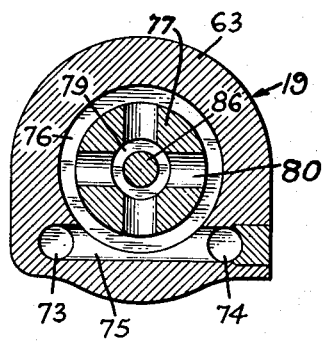
INVENTOR.
ROBERT M. WEBSTER, JR.
BY
HIS ATTORNEYS.

United States Patent Office 2,693,841
Patented Nov. 9, 1954

2,693,841

TIRE INFLATION AND DEFLATION SYSTEM

Robert M. Webster, Jr., Allentown, Pa., assignor to Mack Manufacturing Corporation, New York, N. Y., a corporation of Delaware Application March 7, 1951, Serial No. 214,332

4 Claims. (Cl. 152—417)

This invention relates to a system for inflating and deflating the pneumatic tires of vehicles, such as automobiles, trucks, buses and the like, while the vehicle is stationary or in motion. It relates more particularly to a system which may be controlled by the operator of the vehicle to inflate or reduce the pressure of the tires of the vehicle, selectively, by regulating the pressure of the air or other gas supplied to the tires.

Slow leaks often develop in the tires of military vehicles, intercity buses and the like, while the vehicle is at a place remote from any source of compressed air, or under conditions, for example, in warfare, where it is inadvisable to stop the vehicle to change the leaky or damaged tire. Moreover, very wide pressure fluctuations can occur in the tires, depending upon the speed of the vehicle, atmospheric temperature, and so forth so that the air pressure may increase or decrease to undesirable levels which causes excessive wear on the tire or even danger of blow out. In military vehicles it is frequently necessary when traversing unknown terrain to quickly reduce the tire pressure of all the vehicle's tires to reduce the penetration of the tires in soft mud or snow, and after this to increase the tire pressure when the surface becomes hard. Under any of these conditions, it would be very desirable to be able either to supply air to a partially deflated tire or to partially deflate the over-inflated tire, as required, without stopping the vehicle.

The present invention provides a system whereby the operator of the vehicle can, at any time, regulate the pressure of one or more of the vehicle tires, without leaving the vehicle or stopping. In general, the system includes a source of compressed air which may, for example, be the compressor and air storage tank for the air brakes of the vehicle or an independent compressor and storage tank. A pressure regulating valve is connected to the air storage tank and is manually controlled to regulate the pressure of the air supplied to the tires. The system also includes a manually controlled selector valve to enable air to be supplied to or discharged from any selected tire of the vehicle. The system also includes a pressure responsive inflation valve to enable air to be supplied to the tire or discharged from it, as may be required, and a rotary gas coupling between the axle and the wheel on which the tire is supported to enable the wheel to rotate while the tire is connected to the conduits and other elements of the system which are fixed with respect to the vehicle frame.

The pressure responsive inflation valve and the rotary coupling between the wheel and its supporting axle are important features of the invention which make possible the remote control of inflation and deflation of the tire.

The inflation valve includes elements which enable it to be operated by the air pressure supplied from the air storage tank under the control of the pressure regulating valve. When air is to be supplied to a partially deflated tire, the pressure regulating valve is set to supply air at a pressure higher than the operating pressure of the tire. At this pressure, the pressure responsive inflation valve is actuated to connect the air supply to the tire and thereby inflate it. If the pressure in the tire is too high, the pressure regulating valve is adjusted to supply air to the inflation valve at a pressure less than the pressure in the tire, but higher than atmospheric pressure. At this lower pressure, the inflation valve operates to open the air check valve therein which acts in the place of the usual air check valve of the tire to allow air to escape through a pressure regulating valve to atmosphere. The inflation valve, therefore, allows the pressure in the tire to be increased or decreased at will.

The coupling between the tire supporting wheel and the supporting axle member comprises a substantially leak-tight manifold construction rotatable with the wheel in sealed relation to the axle member. This manifold is an annular channel member having an open side which faces a cylindrical portion on the fixed axle member. Suitable packings prevent leakage between the manifold and the axle member thereby permitting rotation of the wheel relative to the axle while providing a closed annular chamber into which air may be introduced through a passage formed in the axle member. The manifold is connected to the valve stem of the vehicle tire by means of a suitable conduit and the pressure-responsive inflating valve which are carried by and rotate with the wheel. The above-described tire inflating system is especially advantageous for use in military vehicles. These vehicles usually travel in columns, many times under conditions whereby stoppage of a vehicle would delay the entire column. Also, when the vehicle is subjected to gunfire and a tire is punctured, the new inflation system enables the tire to be reinflated or partially inflated so that the vehicle can continue to a safe place.

Also, the danger of blow outs and delays caused by over-inflated or under-inflated tires can be substantially reduced by the tire inflating system embodying the present invention.

For a better understanding of the present invention, reference may be had to the accompanying drawing in which:

Fig. 3 is a view in longitudinal section through the pressure-responsive inflating valve;

Fig. 4 is an end view of the pressure-responsive inflating valve;

Fig. 5 is a view in section through the valve taken on line 5—5 of Fig. 3; and

Fig. 6 is a view in section taken on line 6—6 of Fig. 3.

Figure 1:
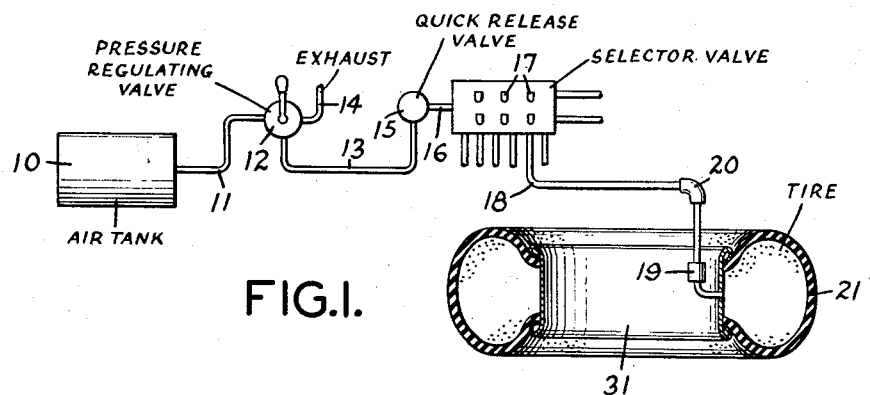
Fig. 1 is a diagrammatic showing of a system embodying the present invention, illustrating the connections between the air storage tank and one of the vehicle tires.

As illustrated diagrammatically in Fig. 1 of the drawing, a typical system may include a source of air or other gas under pressure such as the tank 10. Air may be supplied to the tank 10 by means of an engine-driven or wheel-driven compressor. The tank 10 may be the air storage tank for an air brake system or it may be an independent tank supplied by a suitable pump. The tank 10 is connected by means of a conduit 11 to a manually actuated pressure regulating valve 12 of a conventional type by means of which the air pressure in the system may be regulated. Inasmuch as the air pressure for air brake systems is on the order of 100 to 150 lbs. per square inch, the pressure regulating valve 12 may be adjusted to decrease the air pressure at its outlet conduit 13 to any desired lower valve, for example 10 lbs. per square inch or even lower. The pressure regulating valve may be provided with an exhaust port 14 for venting air from the system described hereinafter.

The outlet connection 13 of the valve 12 is connected to a quick release valve 15 for example, of the type disclosed in U. S. patent to Lane No. 1,412,473. The quick release valve 15 is connected by a conduit 16 to a bank of selector valves 17 corresponding in number to the number of tires connected to the system. The selector valves 17 may have a push button or lever type of control. The six valves 17, illustrated, permit the operator to control the inflation and deflation of the tires, for example of a six wheel vehicle. Each of the valves 17 is connected for example, by means of a different conduit 18 to a different pressure-responsive inflation valve 19 for each tire. The inflation valve 19 is connected to the tire 21 between the valve stem of the tire 21 and the rotary coupling 20.

Figure 2:
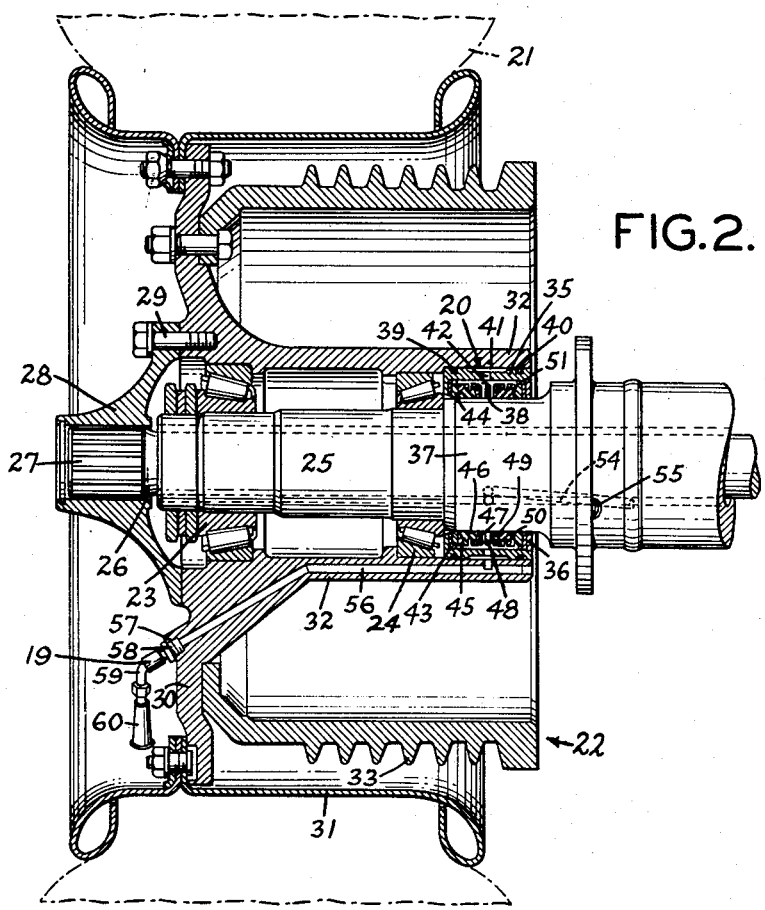
Fig. 2 is a view in vertical section through a vehicle wheel and its supporting and drive axle members illustrating the coupling or manifold system for supplying air to the vehicle tire.

Fig. 2 of the drawings discloses a rotary coupling or manifold 20 for connecting the system to the tire. The coupling 20 is illustrated as applied to a driven rear wheel of a truck or other similar vehicle. It will be understood that the manifold construction described hereinafter is equally applicable to a front steering wheel or to a wheel mounted on a dead or non-driven axle. As illustrated, the wheel 22 is supported by means of tapered roller bearings 23 and 24 on the tubular axle housing extension 25 within which is rotatably mounted the axle drive shaft 26. The inner end of axle drive shaft 26 is connected to a differential, not shown. The outer end of the axle 26 is connected by means of splines 27 to the hub cap 28 which is secured by means of the screws 29 to the outer face of the wheel disc 30 on which the rim 31 is mounted. The wheel 22 also has an elongated generally cylindrical sleeve 32 which is mounted on the outer races of the bearings 23 and 24 thereby supporting the wheel for rotation. The wheel may be provided with a brake drum 33 for cooperation with the usual brake shoes (not shown).

The rotary coupling 20 referred to above may take the form of an annular member or manifold 35 having a channel-shaped cross-section which is mounted within the right-hand end of the sleeve 32 and secured thereto by welding or any other suitable way. The right-hand flange 36 of the manifold is formed separately and is assembled with the remainder of the manifold to enable the seals to be inserted therein, as described hereinafter. The manifold 35 cooperates with a cylindrical portion 37 on the axle housing 25 to form an annular space 38 between them. The outer edges of the manifold 35 are sealed to the cylindrical surface of the sleeve 32 by means of a pair of sealing rings 39 and 40 and the exterior surface of the manifold 35 is provided with a channel 41 thereby forming an annular space between the seals 39 and 40.

The channel 41 is connected to the interior chamber 38 by means of a plurality of passages 42.

The manifold 35 is sealed to the cylindrical portion 37 but rotatable relative thereto. The seals may include a ring member 43 of generally L-shaped cross-section which carries a packing ring 44 formed of felt or the like. A generally triangular steel or bronze supporting ring 45 of triangular section bears against the ring 44. The inclined face of the ring 45 bears against a complementally tapered or triangular packing ring 46 which has its base in contact with the cylindrical portion 37 of the axle housing. A compression ring 47 bears against the opposite inclined side of the packing ring 46 and it is held in tight and wedging relation to the packing ring 46 by means of a spring 48. The opposite end of the spring bears against another compression ring 49 which compresses and wedges another packing ring 50 like the ring 46 against the cylindrical portion 37. The other elements cooperating with the ring 50 are the same as the rings 43, 44 and 45, described above. The various sealing elements are retained in position by means of the ring flange 36 which is inserted in a recess 51 in the right-hand end of the manifold and secured therein by peening or spinning over the adjacent edge of the manifold member.

The above-described coupling 20 permits the wheel 22 to rotate relative to the axle housing 25 but an effective seal is afforded between the manifold 35 and the cylindrical portion 37 on the axle housing.

The gas is introduced into the chamber 38 by means of a passage 54 drilled in the axle housing and communicating with the chamber 38 between the packing rings 46 and 50. The passage has a threaded port 55 outside the area of the wheel to enable a conduit to be connected to it.

The compressed air is discharged to the tire from the chamber 38 and the recess 41 by means of a passage 56 extending lengthwise of the sleeve and terminating in a threaded socket 57 to receive a hose coupling 58. The hose 59 is connected to the inflation valve 19 and the latter is connected to the valve stem 60 of the inner tube. In the structure described, the usual air check valve is omitted from the valve stem 60 for a purpose explained hereinafter.

The port 55 in the axle is connected to the selector valve 17 by the conduit 18.

The inflation valve 19 is disclosed in Figs. 3 to 6. This valve includes a generally cylindrical casing 63 having an internally threaded right-hand end 64 to receive an externally threaded coupling plug 65 by means of which the valve is connected to the valve stem 60. The valve casing 63 has an enlarged central bore 66 which is connected to a smaller internally threaded inlet port 67 which is connected by means of the passage 56 to the coupling 20. Mounted within the enlarged bore 66 is a piston member 68 which is reciprocable lengthwise of the bore 66. The piston 68 has a recess 69 in its left-hand end which communicates with a groove 70 around the periphery of the piston through a plurality of radial passages 71 as shown in Figs. 3 and 5.

Upon displacement of the piston 68 to the right, as viewed in Fig. 3, the groove 70 moves into alignment with the bore 72 formed in the casing 68 and intersecting the bore 66 in the casing. The opposite ends of the bore 72 are closed. The bore 72 communicates near its opposite ends with a pair of bores 73 and 74 extending lengthwise of the casing and communicating with another bore 75 inwardly of the inner end of the coupling plug 65. The ends of the bores 73, 74 and 75 are plugged or sealed. The cross bore 75 communicates with the annular groove 76 in the valve seat member 77 which engages a shoulder 78 near the right-hand end of the bore 66. The valve seat member 77 is a generally annular ring member having the peripheral groove 76 between its ends. The member 77 is held against the shoulder 78 in the bore 66 by means of the coupling plug 65 and a washer 78. The valve seat member 77, as shown in Figs. 3 and 6 includes a central passage 79 which is connected to the groove 76 by means of the radial passages 80. At opposite ends of the member 77 are the annular valve seats 81 and 82 for cooperation respectively with the valve members 83 and 84.

The valve member 83 has a disc-like head 85 and an elongated stem 86 which extends through the passage 79 in the valve seat member and terminates close to the inside of the head of the piston 68. The valve plug 83 and its cooperating seat 81 take the place of the usual air check valve of the inner tube.

The valve plug 84 has an annular head and includes a tubular stem 87 which is slidable on the valve stem 86. The two valves 83 and 84 are normally urged toward their respective seats by means of a coil spring 88 which engages the back of the head of the valve 84 and the inner face of a disc-like spring retainer 89 mounted on the left-hand end of the valve stem 86.

The space between the piston 68 and the valve seat member 77 communicates with atmosphere through a port 90 which may be provided with a breather tube 91 or filter if desired. This space is opened to atmosphere in order to avoid erratic operation due to compressing the air in this space when the piston 68 is actuated by air pressure through port 67.

The operation of the valve 19 is as follows. Assuming that the pressure at the port 67 exceeds the pressure of the air in the tire, the piston 68 will be urged to the right. The surface area of the piston exposed to the pressure exceeds the effective surface area of either of the valves 83 or 84. Preferably, the surface area of the piston exposed to the pressure is about five times that of either of the valves 83 and 84. Accordingly, the piston 68 will be moved by the air pressure until the annular groove 70 therein comes into alignment with the cross bore 72. Air is admitted through the bores 72, 73, 74 and 75 into the annular groove 76 in the valve seat member 77 and in to its internal passage 79, thereby tending to displace the valve 83 to its open position. The movement of the piston will bring it into engagement with the valve stem 86 thereby opening this valve 83 and compressing the spring 88 to hold the valve 84 against its seat 82. Further movement of the piston 68 will cause the liner 89a in spring retainer 89 to engage the end of the stem 87 of the valve 84 thereby positively holding the valve 84 against its seat 82 and preventing leakage between the stems 86 and 88 to atmosphere. The air will then flow past the valve 83 into the tire.

When the selector valve 17 is moved to closed position, air will be vented from the selector valve 17 and the valve 83 will close to prevent escape of air from the tire.

When air is to be discharged from the tire, the pressure regulating valve 12 is adjusted to supply air to the selector valve at a pressure of slightly more than one-fifth the pressure of the air in the tire, assuming that the area of the piston 68 is five times that of the valve 83. When the selector valve is opened, the piston 68 will be displaced to the right connecting the passages therein with the bore 72 and again displacing the valve 83 from its seat by engagement of the piston with the valve stem 86. The pressure in the tire being higher than the pressure in the passages 72, the air pressure in the tire will be reduced to equalize the pressure between the regulating valve 12 and the tire inasmuch as it is directly connected to the pressure regulating valve 12. The reduction of air pressure is read on the gauge in the selector valve assembly and when the pressure reaches the desired value, the pressure regulating valve is manually closed, thus venting the air from the selector valve. The valve 83 then closes and any residual air in the valve 19 is vented by the valve 84.

It will be understood that a valve like the valve 19 is provided for each of the tires of the vehicle and likewise each of the wheels is provided with a manifold 20 of the type described above which is connected to the tire or tires on the wheel. Inasmuch as the selector valve is mounted in a position accessible to the operator of the vehicle, he can inflate or deflate any of the several tires on the vehicle.

It will be understood that the system is susceptible to various changes, as pointed out previously. Thus, the source of air under pressure can be of any convenient type, and the pressure regulating, selector and quick release valves, may be any of the types which are known in the art. Therefore, the form of the invention described herein should be considered as illustrative and not as limiting the scope of the following claims.

I claim:

1. A system for inflating vehicle tires while the vehicle is in motion, each said tire being mounted on a wheel supported for rotation relative to an axle of the vehicle, comprising a source of gas under pressure carried by said vehicle, a rotatable manifold interposed between said axle and said wheel, said manifold being concentric with said axle member and in substantially gastight relation to said axle and wheel, a passage in said axle communicating with said manifold, means connecting said source of gas to said passage including manually operated valve means to connect said source and said passage and disconnect them and regulate the pressure of said gas, means connecting said manifold to said tire, and a pressure responsive valve interposed in said connecting means between said manually operated valve means and said tire, said pressure responsive valve being selectively operable by variation of the gas pressure supplied thereto by said manually operated valve means to introduce gas into said tire and discharge gas therefrom, said pressure responsive valve including a casing mounted on said wheel, a first valve in said casing and normally spring biased to closed position to prevent escape of air from said tire, a piston member movable in said casing in response to pressure of gas higher than atmospheric pressure from said source for engaging and moving said spring biased valve to open position to admit gas into said tire, and a second valve in said casing, said second valve being spring biased to closed position, said piston member being engageable with said second valve to retain it in closed position when the gas pressure on the piston member exceeds the gas pressure in said tire, said second valve being disengaged from said piston member and movable to an open position by gas pressure greater than atmospheric between said first and second valves to discharge gas to atmosphere when said piston member is subjected to gas pressure higher than atmospheric pressure and lower than the gas pressure in said tire.

2. A pressure responsive valve to control the inflation and deflation of a tire mounted on a moving vehicle, comprising a valve casing having a passage therein forming an inlet at one end and an outlet at the other end, a piston member reciprocable in said valve casing and movable from a position closing said passage to a position opening said passage in response to gas pressure thereon at said one end of said passage, a check valve member in said casing movable relative to said piston and having means biasing said check valve toward said piston to a position closing said passage to prevent escape of gas along said passage from said other end of said passage and having a portion adjacent to said piston member for engagement thereby as the latter moves to open said passage, said check valve member being movable by said piston member toward said other end of said passage to open said passage for flow of gas therethrough and a relief valve member in said casing movable relative to said piston and said check valve member, said relief valve member being movable in response to a higher pressure than atmospheric in said casing between said check valve member and said relief valve member to discharge gas from said casing to atmosphere when the piston member is subjected to a pressure higher than atmospheric pressure but lower than the gas pressure in said other end of said passage.

3. A pressure responsive valve, comprising a valve casing having a bore therein, a piston reciprocable in said bore, means to introduce gas into one end of said bore to displace said piston along said bore, a passage in said casing connected at opposite ends to spaced apart portions of said bore, a port in said piston communicating with said bore and movable into and out of communication with one end of said passage upon movement of said piston in said bore, a valve seat member in said bore having oppositely facing valve seats thereon and an opening through said seats communicating with the other end of said passage, coaxial valve plugs cooperating with said seats, and means normally biasing said plugs in opposite directions against said seats to close opposite ends of said opening, said valve plugs having concentric stems extending toward said piston, the stem on the valve plug on the opposite side of said valve seat member from said piston being sufficiently long to be engaged and displaced by said piston upon movement of the latter to a position bringing said port into communication with said passage to permit gas to flow through one end of said opening.

4. The valve set forth in claim 3, comprising a vent in said casing on the opposite side of said valve seat member from the last-mentioned port.

References Cited in the file of this patent

UNITED STATES PATENTS

| Number | Name | Date |
|---|---|---|
| 1,166,221 | Kahn | Dec. 28, 1915 |
| 1,699,378 | Smith | Jan. 15, 1929 |
| 2,452,527 | Peter | Oct. 26, 1948 |